United States Patent
Yuyama

(10) Patent No.: US 7,548,271 B2
(45) Date of Patent: Jun. 16, 2009

(54) FLASH DEVICE, CAMERA DEVICE AND METHOD AND PROGRAM THEREOF FOR THE ELIMINATION OF WASTEFUL POWER CONSUMPTION THEREIN

(75) Inventor: Masami Yuyama, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 841 days.

(21) Appl. No.: 10/965,309

(22) Filed: Oct. 14, 2004

(65) Prior Publication Data

US 2005/0062877 A1 Mar. 24, 2005

Related U.S. Application Data

(63) Continuation of application No. PCT/JP03/16024, filed on Dec. 15, 2003.

(30) Foreign Application Priority Data

Dec. 27, 2002 (JP) ............................. 2002-381365

(51) Int. Cl.
*H04N 5/222* (2006.01)
*H04N 5/225* (2006.01)
*G03B 15/03* (2006.01)
(52) U.S. Cl. .................. 348/371; 348/372; 396/155
(58) Field of Classification Search ............ 348/370, 348/371, 372; 396/155, 156, 176
See application file for complete search history.

(56) References Cited

U.S. PATENT DOCUMENTS 4,333,718 A 6/1982 Adams, Jr. et al.
(Continued)

FOREIGN PATENT DOCUMENTS

JP 10-013779 A 1/1989
(Continued)

OTHER PUBLICATIONS

Chinese Office Action (and English translation thereof) dated Oct. 10, 2008, issued in a counterpart Chinese Application.

(Continued)

*Primary Examiner*—Nhan T Tran
*Assistant Examiner*—Trung Diep
(74) *Attorney, Agent, or Firm*—Frishauf, Holtz, Goodman & Chick, P.C.

(57) ABSTRACT

In a REC mode of an ordinary image pickup standby state, a main capacitor is connected to a side of a step-up/charging circuit via a switch, and the main capacitor is charged with electric power of a charging battery. When the REC mode is changed to other modes, the main capacitor is connected to a side of a step-down circuit by a switching operation of the switch. The step-down circuit steps down charging voltage of the main capacitor to 4.2 V to supply it to a power supply circuit of a camera, and steps down the charging voltage to 5 V to supply it to the charging battery which is a power supply of the camera. When it is no longer necessary to emit fill light, the electric power lost from the main capacitor due to natural discharge can automatically be utilized efficiently for operations other than the emission of the fill light.

6 Claims, 5 Drawing Sheets

U.S. PATENT DOCUMENTS

| | | | | |
|---|---|---|---|---|
| 5,227,831 | A | * | 7/1993 | Miyazaki et al. ............... 396/77 |
| 5,852,358 | A | | 12/1998 | Ehsani |
| 6,054,814 | A | | 4/2000 | Constable |
| 6,571,061 | B2 | * | 5/2003 | Kawasaki et al. ........... 396/156 |
| 2004/0027480 | A1 | * | 2/2004 | Hamamura ................. 348/371 |
| 2004/0264223 | A1 | * | 12/2004 | Pihlstrom et al. ............. 363/89 |

FOREIGN PATENT DOCUMENTS

| JP | 11-252447 A | 9/1999 |
|---|---|---|
| JP | 2002-287218 A | 10/2002 |
| JP | 2003-280071 A | 10/2003 |
| TW | 031473 | 7/1980 |

OTHER PUBLICATIONS

Japanese Office Action dated Jan. 27, 2009 and English translation thereof issued in a counterpart Japanese Application No. 2002-381365.

* cited by examiner

FLASH DEVICE, CAMERA DEVICE AND METHOD AND PROGRAM THEREOF FOR THE ELIMINATION OF WASTEFUL POWER CONSUMPTION THEREIN

CROSS-REFERENCE TO RELATED APPLICATIONS

This is a Continuation Application of PCT Application No. PCT/JP03/16024, filed Dec. 15, 2003, which was published under PCT Article 21(2) in English.

This application is based upon and claims the benefit of priority from prior Japanese Patent Application No. 2002-381365, filed Dec. 27, 2002, the entire contents of which are incorporated herein by reference.

BACKGROUND OF THE INVENTION

1. Field of the Invention

The present invention relates to a flash device, a camera device with the flash device, and a method and program thereof.

2. Description of the Related Art

Recently, digital cameras have generally become widespread which use a solid-state image sensing device of a CCD type or MOS type to image a subject and store it as image data in a storage medium such as a flash memory. Most of such digital cameras are equipped with strobes (flash devices) similar to those of conventional cameras.

The strobe built in a camera is configured to step up a voltage of a battery stored in a camera main body, as is well known, and charge a main capacitor with the voltage, and at the time of picking up an image, it gives a charge stored in the main capacitor to a discharge tube (such as a xenon tube) via a trigger coil in accordance with a trigger signal, so as to discharge it to emit light. In addition, a capacitance of the main capacitor is about 50 µF to 200 µF, which fluctuates depending on a difference in an amount of light which is to be emitted by the strobe.

Furthermore, if the voltage of the main capacitor becomes lower than a voltage that enables light emission, most of the digital cameras generally restart charging so that the strobe light can always be emitted. The charge given to the main capacitor is maintained in a state stored in the main capacitor even after a power switch of the camera is turned off, and is lost due to natural discharge as time passes (refer to Jpn. Pat. Appln. KOKAI Publication No. 2000-122130).

BRIEF SUMMARY OF THE INVENTION

However, a charge lost as described above can be expressed by $$(1/2) \cdot C \cdot V^2$$

wherein C is the capacitance of the main capacitor and V is the charging voltage, and electric power for this is wasted from the battery.

On the other hand, a prolonged battery life (continuous use time per battery change or charging) is required in recent digital cameras owing to increased capacity of storage media to be used and corresponding increase in the number of images that can be stored and increase in time of picking up moving images, but there is naturally a limit in power supply capacity that can be secured in order to maintain a reduced size, reduced weight and design diversity of an apparatus.

Therefore, it has been a challenge to find ways to eliminate wasteful power consumption in the strobe described above. This can be achieved if the strobe light is not available for emission all the time, which is not realistic due to inconvenience caused thereby.

The present invention has been attained in view of the problems heretofore posed, and its object is to provide a flash device, a camera device with the flash device, and a method and program thereof which can eliminate wasteful power consumption and extend a life of a power supply battery.

In order to solve the problems described above, the invention according to claim 1 provides a flash device which emits fill light at the time of image pickup by use of electric power charging a main capacitor, and the flash device comprises: step-down means for stepping down charging voltage of the main capacitor and supplying the voltage as the electric power elsewhere; a switch which performs a switching operation to switch the main capacitor from a charging circuit of the main capacitor to the step-down means so as to connect the main capacitor to the step-down means; and control means for causing the switch to perform the switching operation as required.

Furthermore, in the invention according to claim 2, the flash device comprises detection means for detecting the charging voltage of the main capacitor; and when the charging voltage detected by the detection means is a prescribed voltage or higher, the control means causes the switch to perform the switching operation.

Furthermore, in the invention according to claims 3 and 4, the step-down means has a plurality of feeding paths which supplies the stepped down power of the main capacitor elsewhere.

Furthermore, in the invention according to claims 5 and 6, the step-down means supplies the stepped down power of the main capacitor to a charging circuit of a charging battery used for charging the main capacitor.

Furthermore, in the invention according to claims 7 and 8, the step-down means supplies the stepped down power of the main capacitor to other circuits which are supplied with electric power from the charging battery used for charging the main capacitor.

Furthermore, in the invention according to claims 9, 10 and 11, the step-down means supplies the stepped down power of the main capacitor to the charging circuit of the charging battery used for charging the main capacitor and to the other circuits which are supplied with electric power from the charging battery.

According to one aspect of the invention, a camera device is provided which is equipped with a flash device to emit light at a time of image pickup by using electric power charged in a main capacitor. The camera device includes: (i) a step-down circuit which steps down a charged voltage of the main capacitor and supplies the voltage to perform a housing operation of a lens of the camera device; (ii) a switch which performs a switching operation to switch the main capacitor from a charging circuit of the main capacitor to the step-down circuit; and (iii) a control device which, when an image pickup standby mode which requires preparation for the emission of the light is terminated, controls the switch to perform the switching operation.

DETAILED DESCRIPTION OF THE INVENTION

Figure 1:
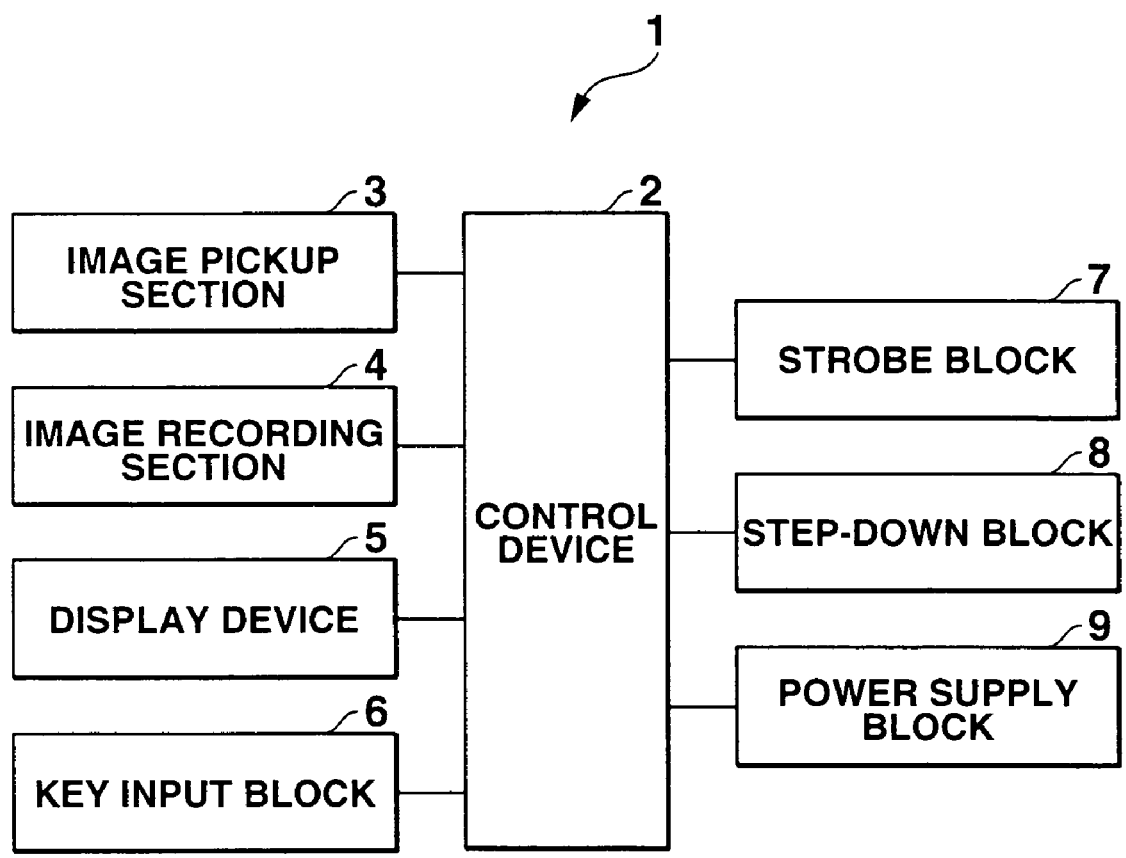
FIG. 1 is a block diagram of a digital camera showing one embodiment of the present invention.

One embodiment of the present invention will hereinafter be described in accordance with the drawings. FIG. 1 is a block diagram showing a schematic configuration of a digital camera 1 according to the present invention.

The digital camera 1 is constituted of a control device 2, and an image pickup section 3, an image recording section 4, a display device 5, a key input block 6, a strobe block 7, a step-down block 8 and a power supply block 9 whose operations are controlled by the control device. In the present embodiment, the control device 2, the strobe block 7, the step-down block 8 and the power supply block 9 actualize a flash device of the present invention.

The control device 2 has a ROM storing a predetermined program and a RAM for working, and is a microcomputer comprising various kinds of digital signal processing functions including data compression and decompression. The control device 2 operates in accordance with the program stored in the ROM to function as control means of the present invention.

The image pickup section 3 includes, for example, an optical system which forms an image of a subject, a lens motor provided in a drive mechanism of the optical system, a image pickup device such as a CCD which picks up the image of the subject formed by the optical system through photoelectric transfer, and a signal processing circuit which, for example, amplifies a pickup image signal output by the image pickup device and converts it to a digital signal. The image pickup section 3 sends the digital pickup image signal to the control device 2.

The image recording section 4 is constituted of a flash memory, a card memory detachable from a main body, and the like, which records the image of the subject which is picked up by the image pickup section 3 and then compressed by the control device 2 in a method such as JPEG. In addition, the image recording section 4 records other data if necessary.

The display device 5 includes a liquid crystal display and other drive circuits, and it displays the image picked up by the image pickup section 3 as a through image in an image pickup standby state where a shutter key is not depressed in a REC mode for image pickup, while it displays the image read from the image recording section 4 in a PLAY mode for recorded image reproduction.

The key input block 6 is constituted of various kinds of operation keys such as a shutter key, an image selection key, a mode key to set an operation mode, and power switch. Scan signals are sequentially sent to the key input block 6 from the control device 2 by interrupt processing, and when a user operates any of the operation keys, it is detected by the control device 2.

Figure 2:
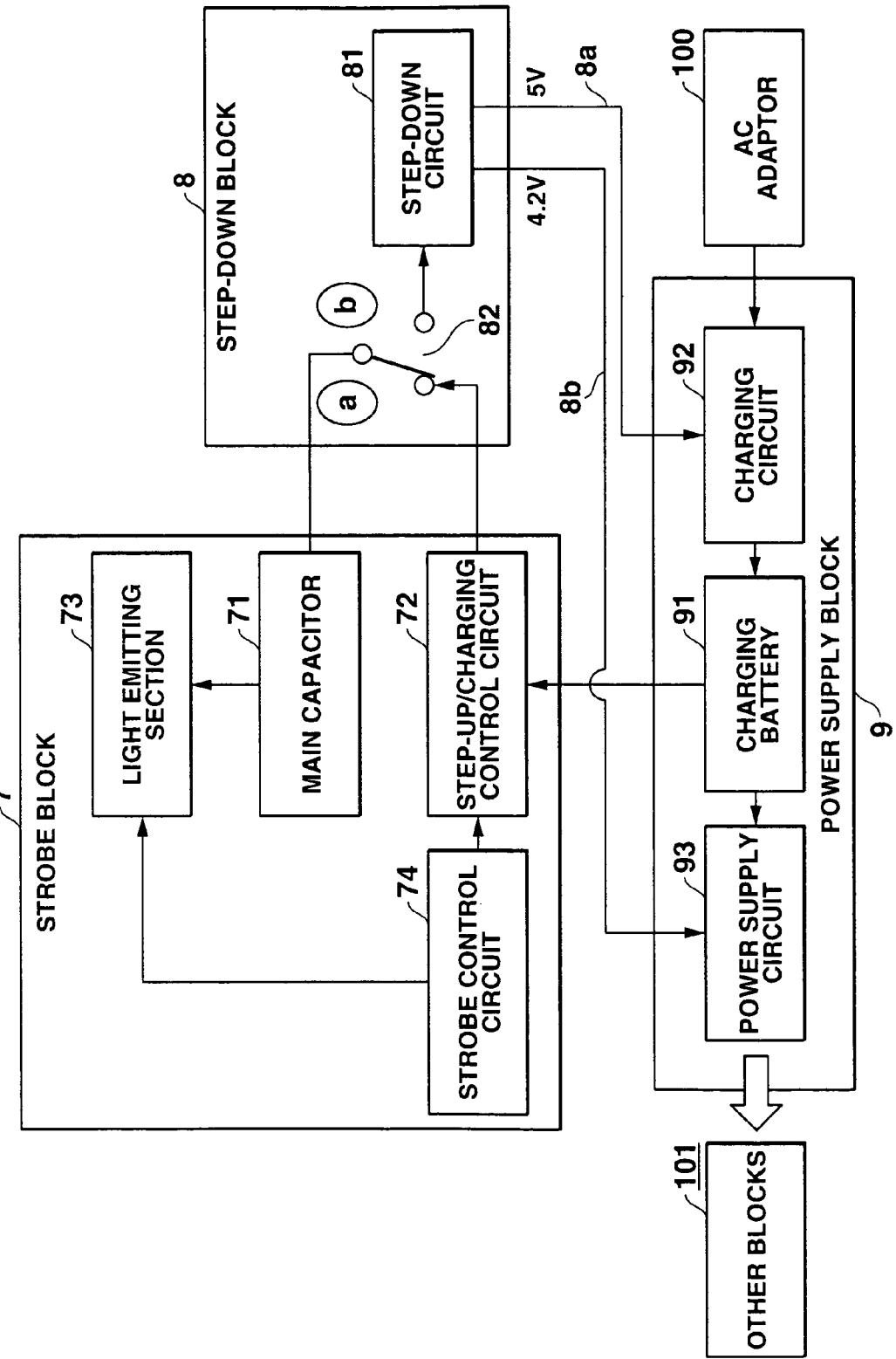
FIG. 2 is a block diagram showing essential parts of the digital camera.

FIG. 2 is a block diagram showing details of the strobe block 7, the step-down block 8 and the power supply block 9. The power supply block 9 is constituted of a charging battery 91 of lithium ion or the like which is a power supply of the digital camera 1; a charging circuit 92 which supplies the charging battery 91 with electric energy supplied from a domestic power supply or the like via an AC adaptor 100; and a power supply circuit 93 which supplies the electric power of the charging battery 91 to other blocks 101.

The strobe block 7 is constituted of a step-up/charging circuit 72 which steps up a voltage of 3.4 V of the charging battery 91 to about 300 V and supplies the stepped up voltage to a main capacitor 71; a light emitting section 73 including a discharge tube such as a xenon tube as a light source, a trigger coil and a drive element for stepping up a voltage of the main capacitor 71 to about 2 KV or higher so that the discharge tube discharges electricity; and a strobe control circuit 74 which controls operations of the step-up/charging circuit 72 and the light emitting section 73.

Figure 3:
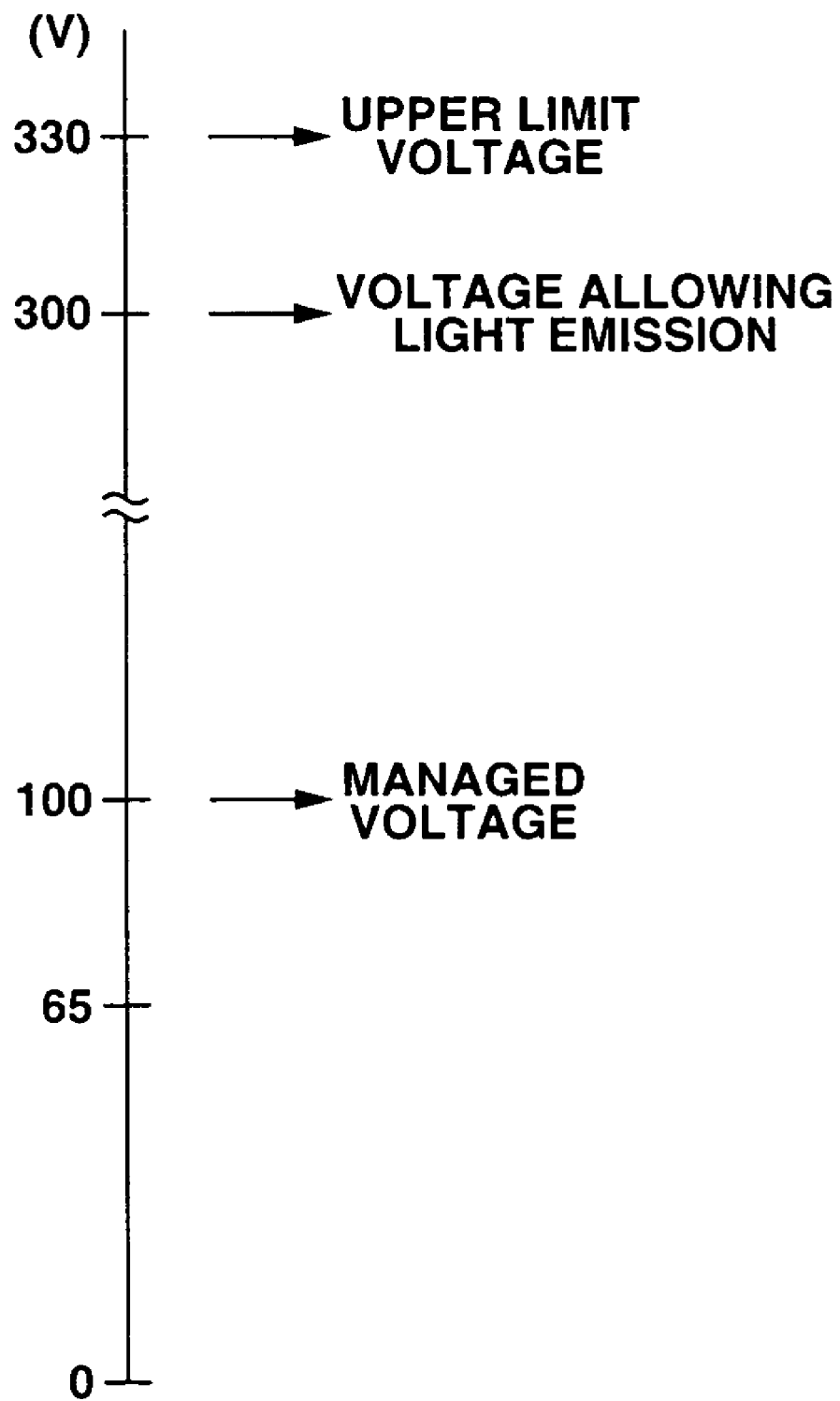
FIG. 3 is a graph showing set values of charging voltages in a main capacitor.

The strobe control circuit 74 causes the drive element to drive the trigger coil in accordance with a trigger signal sent from the control device 2 at the time of image pickup so that the discharge tube discharges electricity, thereby emitting fill light for image pickup. Also, the strobe control circuit 74 is detection means of the present invention for detecting the charging voltage of the main capacitor 71 via the step-up/charging circuit 72, and controls an operation of charging the main capacitor 71 in the step-up/charging circuit 72. In addition, in the present embodiment, control is performed so that the charging voltage of the main capacitor 71 will be over a value (100 V) that enables the discharge tube to emit light and below an upper limit value (330 V) (see FIG. 3).

The step-down block 8 is constituted of a step-down circuit 81 which steps down the voltage of the main capacitor 71 to supply it to the power supply block 9; and a switch 82 which switches a connection of the main capacitor 71 to the step-up/charging circuit 72 of the strobe block 7 (side b in the drawing) or to the step-down circuit 81 (side a in the drawing). Power is fed from the step-down circuit 81 to the power supply block 9 via a first power feeder 8a whose output voltage is set to 5 V and a second power feeder 8b whose output voltage is set to 4.2 V. The first power feeder 8a (5 V side) is connected to the charging circuit 92, while the second power feeder 8b (4.2 V side) is connected to the power supply circuit 93. Further, operations of the step-down circuit 81 and the switch 82 are controlled by the control device 2, and the step-down circuit 81 is controlled so that it maintains a connection state with the power supply block 9 via one of the first power feeder 8a or the second power feeder 8b.

Next, operations when the user operates the power key of the key input block 6 in the above configuration will be described in reference to flowcharts of FIG. 4 and FIG. 5.

Figure 4:
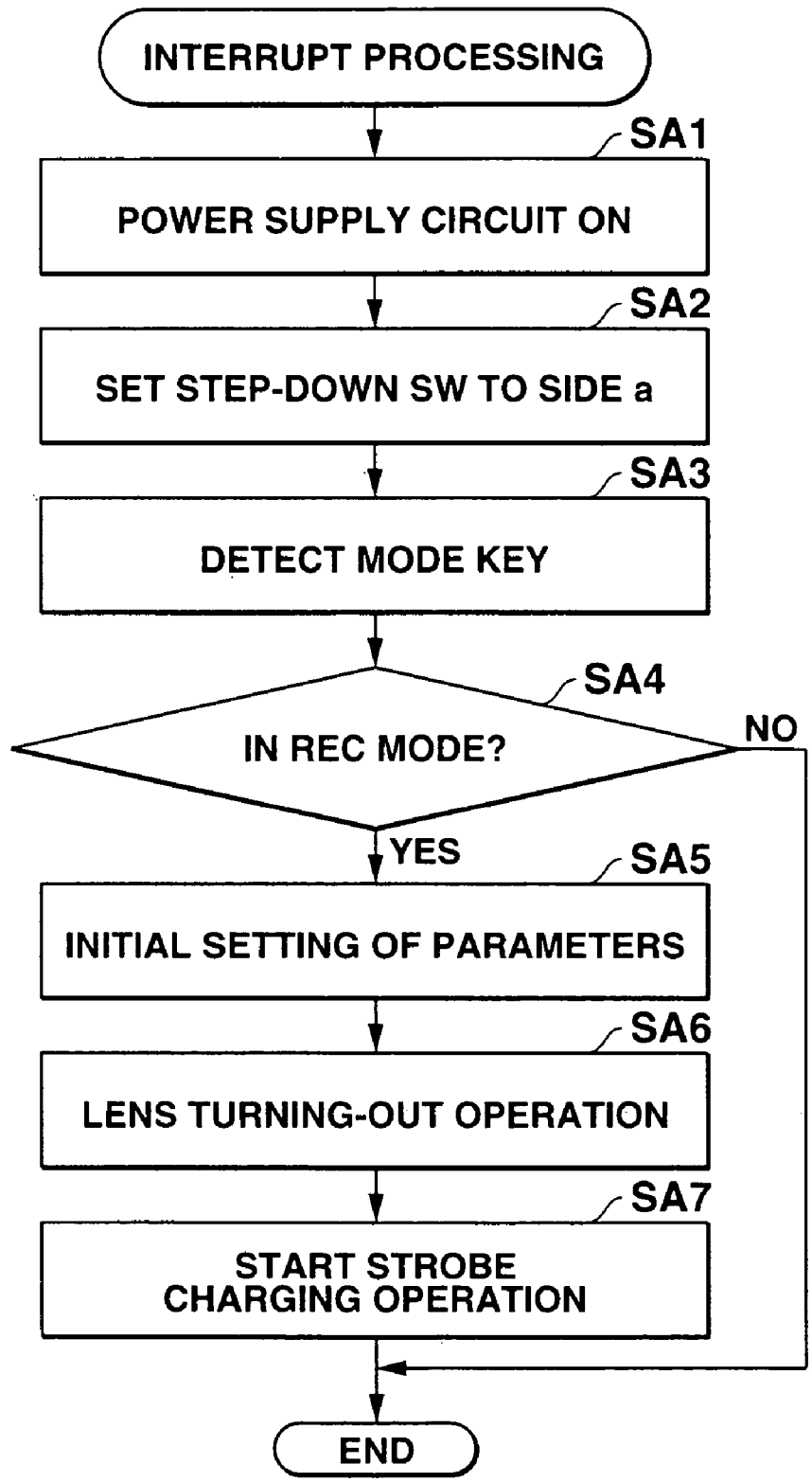
FIG. 4 is a flowchart showing an operation when a power key is turned on in the digital camera.

FIG. 4 is a flowchart showing contents of the interrupt processing executed when the control device 2 detects an ON operation of the power key. The control device 2 causes the power supply circuit 93 to start supplying power to the components shown in FIG. 1 at the start of the processing (step SA1), and then immediately sets the switch 82 of the step-down block 8 to the side a (step SA2). Subsequently, the control device 2 detects a state of the operation mode set by the mode key (step SA3), and merely stops the processing if the operation mode is not the REC mode (NO in step SA4), and then moves to processing of other operation modes such as the PLAY mode. On the other hand, when the REC mode is set (YES in step SA4), the control device 2 performs initial setting of various parameters necessary for the operation in the REC mode (step SA5), and after a turning-out operation of a lens in the image pickup section 3 (step SA6), the control device 2 causes the strobe control circuit 74 to start charging the main capacitor 71 (step SA7).

Incidentally, the operation when the user turns on the power key has been described here, but the processing after the step SA2 described above is executed also when the user performs a changing operation of the operation mode during use after the power key is turned on, for example.

Figure 5:
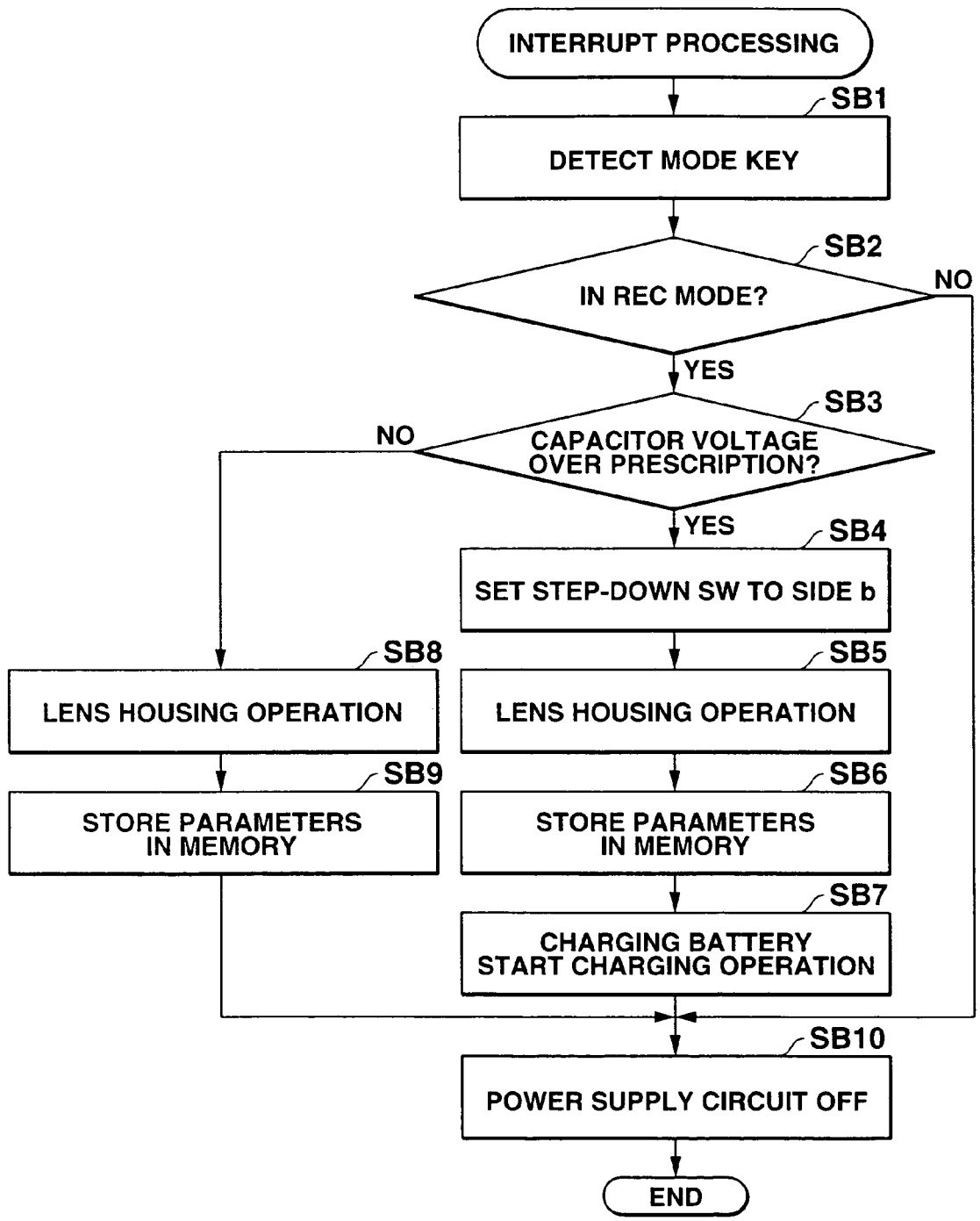
FIG. 5 is a flowchart showing an operation when the power key is turned off in the digital camera.

Furthermore, FIG. 5 is a flowchart showing the interrupt processing executed when the control device 2 detects an OFF operation of the power key. The control device 2 detects the state of the operation mode set by the mode key at the start of the processing (step SB1), and immediately stops power supply to the components from the power supply circuit 93 (step SB10) if the operation mode is not the REC mode (NO in step SB2), and terminates the processing. In addition, even in that case, the control device 2 performs processing corresponding to other operation modes such as the PLAY mode, which is not shown.

Furthermore, when the REC mode is set (YES in step SB2), the control device 2 determines whether or not the charging voltage of the main capacitor 71 detected by the strobe control circuit 74 is a predetermined voltage or higher, that is, 100 V or higher in the present embodiment (step SB3). Here, if the charging voltage is 100 V or higher (YES in step SB3), the control device 2 sets the switch 82 of the step-down block 8 to the side b, and causes the step-down circuit 81 to start supplying electricity to the power supply circuit 93 of the power supply block 9 via the second power feeder 8b (step SB4).

Next, the image pickup section 3 performs a housing operation of the lens (step SB5), and various parameters necessary for the operation in the REC mode are stored in the flash memory or the like (step SB6). Further, the control device 2 causes the step-down circuit 81 to start supplying electricity to the charging circuit 92 of the power supply block 9 via the first power feeder 8b, that is, to start an operation of charging the charging battery 91 (step SB8), and then stops the power supply to the components from the power supply circuit 93 (step SB10), thereby finishing the processing. In other words, the operation for turning off the power supply is performed by use of the power remaining in the main capacitor 71, and remaining power is returned to the charging battery 91.

On the other hand, when the result of determination in step SB3 described above is NO and the charging voltage of the main capacitor 71 at the moment of turning off the power key is below 100 V, for example, immediately after an image is picked up by use of the strobe or when a slight amount of time has passed since the power key is turned on, only the housing operation of the lens described above and storage of the various parameters are performed (steps SB8, SB9), and the power supply to the each component from the power supply circuit 93 is stopped (step SB10), thus terminating the processing. In other words, the low charging state of the main capacitor 71 is maintained as it is.

As described above, in the present embodiment, when the REC mode is set at the point of turning off the power key, that is, when it is not necessary to prepare the emission of the fill light, the power remaining in the main capacitor 71 is automatically utilized for the operation to turn off the power supply if the charging voltage of the main capacitor 71 is 100 V or higher, and remaining power is returned to the charging battery 91. It is thus possible to effectively utilize the power remaining in the main capacitor 71 which has conventionally been lost due to natural discharge. Therefore, wasteful power consumption can be eliminated, and a life of a charging battery, that is, continuous use time per battery change or charging can be extended. Moreover, the power remaining in the main capacitor 71 can be directly utilized for the operation to turn off the power supply, so that it is highly effectively utilized.

Furthermore, if the charging voltage of the main capacitor 71 is below 100 V, this charging voltage is maintained as it is, so that time to charge the main capacitor 71 when the power supply is turned on next time can be prevented from being unnecessarily longer. Therefore, it is possible not only to prolong the battery life mentioned above but also to minimize the inconvenience caused thereby.

In addition, for the prolongation of the battery life, the power of the main capacitor 71 may be unconditionally utilized without its charge state (remaining power) being checked. However, if the voltage supplied from the step-down circuit 81 to the power supply block 9 is insufficient, the power from the main capacitor is not used.

Furthermore, in the configuration described above, supply ends of the power of the main capacitor 71 are the power supply circuit 93 and the charging circuit 92 and these supply ends can be switched, but this is not a limitation, and a configuration in which the remaining power is always supplied to both of the supply ends may also be possible. However, when the supply ends need different voltages as in the present embodiment, it is convenient to use the remaining power if the configuration capable of switching is adopted.

Still further, the operation in which the power supply is turned off in the state where the REC mode is set has been mainly described in the present embodiment. In addition to this, for example, when the user switches the mode from the REC mode to other operation modes such as the PLAY mode or a movie mode for picking up moving images, it can be more effective if the remaining power of the main capacitor 71 is utilized for operations in those operation modes. It is also effective when prohibition of the use of the strobe is set in the REC mode.

Further yet, the remaining power of the main capacitor 71 is used for the charging operation of the charging battery 91 and other operations in the present embodiment, but such a configuration may also be possible that the remaining power is used only for the charging operation of the charging battery 91. In addition, the remaining power of the main capacitor 71 fluctuates, so that if, for example, it is used for a plurality of operations, these operations may be switched depending on the remaining power.

Further yet, the case where the present invention is employed for the digital camera which stores the image of the subject picked up by the image pickup device as digital data has been described, but in addition to this, it can also be employed for mobile telephones with cameras, PDAs with cameras, and silver cameras with the strobes as long as those are camera devices equipped with the strobes. In those cases, the same effects can also be obtained as in the present embodiment. Especially, more remarkable effects can be obtained in the mobile telephones with cameras because capacity of its power supply is significantly limited.

Further yet, the flash device of the present invention does not always need to be built in the digital camera, and it may be a separate flash device that is separately connected to the digital camera or the like.

What is claimed is:

1. A camera device equipped with a flash device to emit light at a time of image pickup by using electric power charged in a main capacitor, the camera device comprising:
   step-down means for stepping down a charged voltage of the main capacitor and supplying the voltage to perform a housing operation of a lens of the camera device;
   a switch which performs a switching operation to switch the main capacitor from a charging circuit which charges the main capacitor to the step-down means so as to connect the main capacitor to the step-down means;

control means for, when an image pickup standby mode which requires preparation for the emission of the light is terminated, controlling the switch to perform the switching operation; and detection means for detecting the charged voltage of the main capacitor;

wherein the control means causes the switch to perform the switching operation when the charged voltage detected by the detection means is a prescribed voltage or higher; and wherein the step-down means has a feeding path to supply the voltage of the main capacitor elsewhere.

2. A camera device equipped with a flash device to emit light at a time of image pickup by using electric power charged in a main capacitor, the camera device comprising:

step-down means for stepping down a charged voltage of the main capacitor and supplying the voltage to perform a housing operation of a lens of the camera device;

a switch which performs a switching operation to switch the main capacitor from a charging circuit which charges the main capacitor to the step-down means so as to connect the main capacitor to the step-down means;

control means for, when an image pickup standby mode which requires preparation for the emission of the light is terminated, controlling the switch to perform the switching operation; and detection means for detecting the charged voltage of the main capacitor;

wherein the control means causes the switch to perform the switching operation when the charged voltage detected by the detection means is a prescribed voltage or higher; and wherein the step-down means supplies the voltage of the main capacitor to a charging circuit of a charging battery used for charging the main capacitor.

3. A camera device equipped with a flash device to emit light at a time of image pickup by using electric power charged in a main capacitor, the camera device comprising:

step-down means for stepping down a charged voltage of the main capacitor and supplying the voltage to perform a housing operation of a lens of the camera device;

a switch which performs a switching operation to switch the main capacitor from a charging circuit which charges the main capacitor to the step-down means so as to connect the main capacitor to the step-down means; and control means for, when an image pickup standby mode which requires preparation for the emission of the light is terminated, controlling the switch to perform the switching operation;

wherein the step-down means supplies the voltage of the main capacitor to another circuit which is supplied with electric power from a charging battery used for charging the main capacitor.

4. The camera device according to claim 3, further comprising:

detection means for detecting the charged voltage of the main capacitor;

wherein the control means causes the switch to perform the switching operation when the charged voltage detected by the detection means is a prescribed voltage or higher.

5. A camera device equipped with a flash device to emit light at a time of image pickup by using electric power charged in a main capacitor, the camera device comprising:

step-down means for stepping down a charged voltage of the main capacitor and supplying the voltage to perform a housing operation of a lens of the camera device;

a switch which performs a switching operation to switch the main capacitor from a charging circuit which charges the main a switch which performs a switching operation to switch the main capacitor from a charging circuit which charges the main capacitor to the step-down means so as to connect the main capacitor to the step-down means; and control means for, when an image pickup standby mode which requires preparation for the emission of the light is terminated, controlling the switch to perform the switching operation;

wherein the step-down means supplies the voltage of the main capacitor to a charging circuit of a charging battery used for charging the main capacitor and to another circuit which is supplied with electric power from the charging battery.

6. The camera device according to claim 5, further comprising:

detection means for detecting the charged voltage of the main capacitor;

wherein the control means causes the switch to perform the switching operation when the charged voltage detected by the detection means is a prescribed voltage or higher.

* * * * *